Figure 1:
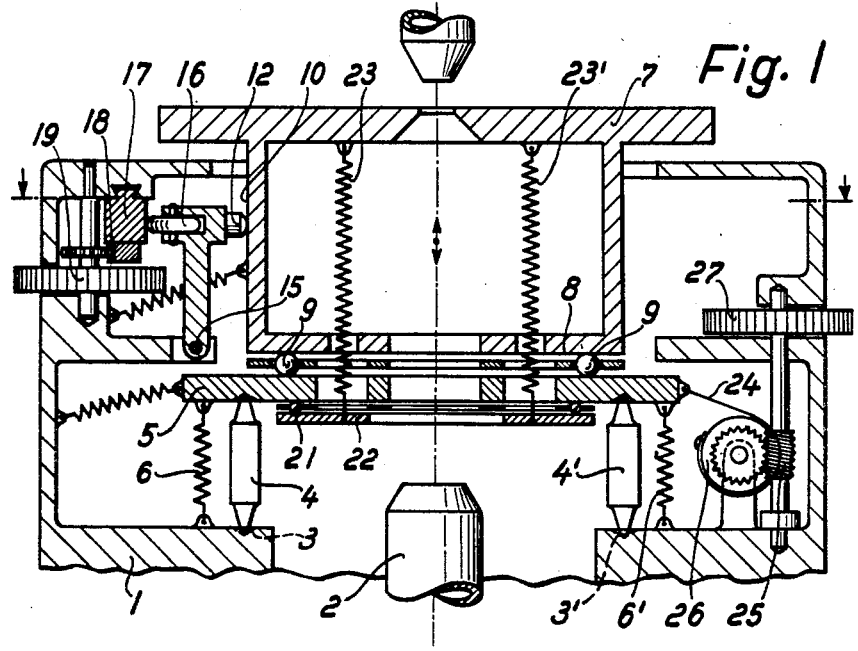

Nov. 28, 1961    O. MALFELD    3,010,363
PARALLELOGRAM GUIDE FOR OBJECT TABLES AND THE LIKE
Filed Aug. 25, 1959

INVENTOR
Otto Malfeld
BY Benj. T. Rauber
his attorney

United States Patent Office 3,010,363
Patented Nov. 28, 1961

3,010,363
PARALLELOGRAM GUIDE FOR OBJECT
TABLES AND THE LIKE
Otto Malfeld, Wetzlar (Lahn), Germany, assignor to Ernst Leitz, G.m.b.H., Wetzlar (Lahn), Germany, a corporation of Germany
Filed Aug. 25, 1959, Ser. No. 835,998
Claims priority, application Germany Sept. 25, 1958
9 Claims. (Cl. 88—40)

With microscopes and other precision mechanical apparatus the problem exists to adjust without play and very precisely a supported part, particularly the object table. It has already been proposed to substitute for the most commonly used ball bearing raceway drive a screw drive, a parallelogram drive. Such a parallelogram drive consists of two links one end of each being pivotally supported in fixed position and the other ends being joined to each other in order to actuate the movable part parallel to itself. Since in this arrangement each point of the connecting bar joining the free ends of the links describes a circular arc, the moved element accomplishes not alone the desired movement but there also occurs a sidewise component. If one thus arranges an object table of a microscope in known manner on the horizontal connecting link of a parallelogram, he will obtain simultaneously with a rise in the position of the table a sidewise shifting so that the object wanders out of the field of vision of the microscope.

This sidewise deflection with a parallelogram drive for object tables and similar articles is obviated by my invention (a) by movably mounting the object table on a movable side of a parallelogram and (b) by guiding it with at least one limit stop with a vertical guiding surface, so that for the positioning of the level of the object table only the vertical component of the arc of movement is operative. In particular the side of the parallelogram lying parallel to the plane of the fixed pivot points of the parallelogram links is formed as a plate on which the object table rolls or glides with a ball or point support. The very sensitive height adjustment of an object table by means of a parallelogram drive acting in a tangential direction is thereby attained so that in the neighborhood of the zero of a null position, that is, with about an upright position of the parallelogram links, only a very slight shifting in the radial direction occurs and thus a support as free as possible from play is attained. The height position Δ of the object table with a parallelogram actuation of this type is given by the equation $\Delta = r(1 - \cos \gamma)$ in which $r$ is the length of the parallelogram links and $\gamma$ is the angle of inclination from the perpendicular to the plane of the pivotal points of the parallelogram links.

A further embodiment of the invention comprises two stops against which the table is pressed by springs which are adjustable in the two co-ordinates of the plane of the table. By this means the known cross adjustment of the table is obtained.

In the accompanying drawings an embodiment of the object table of my invention is illustrated by way of example in which—

Figure 2:
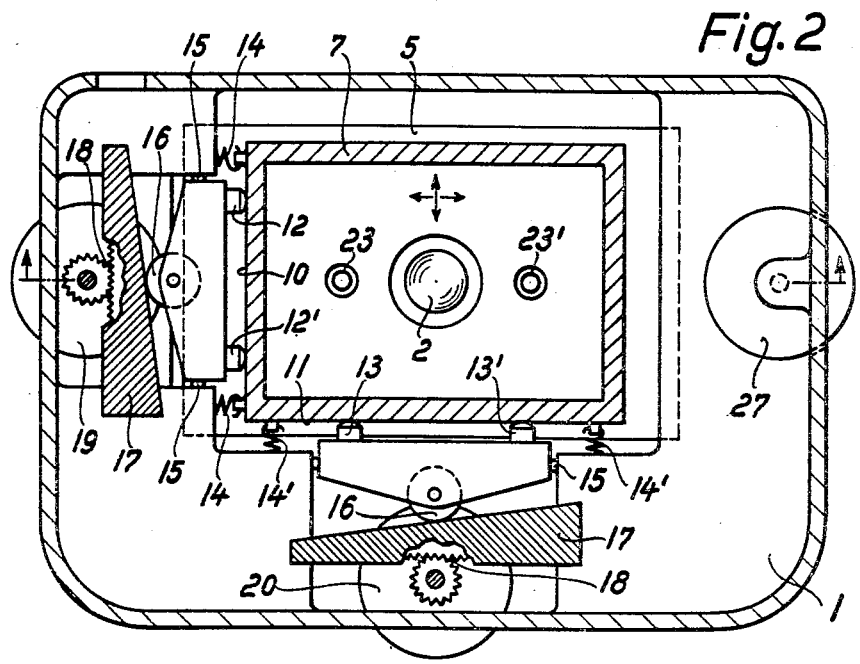

FIG. 1 is a vertical section, and
FIG. 2 is a horizontal sectional plan view taken on the line 2—2 of FIG. 1.

In the drawings the embodiment comprises a housing 1 into which the microscope condenser 2 projects. The housing has four supports of which two supports 3 and 3' are shown in FIG. 1. Parallelogram links, of which two, 4 and 4' are shown in the drawings and provided with knife edge ends are supported vertically on the supports 3, 3' and carry on their upper ends a plate 5 which is pressed onto the links by springs 6, 6' secured to the housing. On the plate 5 an object table 7 is slidably supported with its under surface resting on balls 9. The table has precision finished side surfaces 10 and 11 with which it is guided on the stops 12, 12', 13, 13'. The table is pressed to the stops by springs 14 and 14' and the stops are adjustable by a wedge actuation. For this purpose the stops 12, 12' are tiltable about the pivots 15 and are provided with a roller 16 which acts in cooperation with a wedge 17 actuated for adjustment through a rack bar drive 18 by a rotatable knob 19. A similar arrangement is provided for the stops 13, 13' adjustable from a rotatable knob 20. These adjustable stops operate in the manner of a cross table adjustment and serve simultaneously for an exact guidance of the table 7 in the direction of the optical axis of the microscope. On the under side of the plate 5 a plate 22 is slidably supported by balls 21 and is connected to the upper plate of the table 7 by springs 23, 23' so that the table is pressed to the balls 9 and yet can glide easily on the plate 5. A cord 24 serves for shifting the parallelogram plate 5 and is windable on a roll 26 by means of a worm drive 25. A turning knob 27 serves to actuate the worm drive.

Having described my invention, what I claim is:

1. A parallelogram actuator for microscope object tables which comprises an object table having a horizontal surface and a vertical guide surface, a supporting element having an upper surface on which the object table is slidably supported, a fixed support below said supporting element, parallel links pivoted on said support and pivoted to said supporting element to vary the height of said supporting element above said supports by tilting said links to and from vertical position, and a guide element positioned to abut said vertical guide surface of said object table to prevent sidewise movement of said object table in the direction of sidewise movement of said supporting element.

2. The actuator of claim 1 in which said supporting element comprises a plate having an upper surface parallel to the pivots of said links on said support.

3. The actuator of claim 2 having ball bearings on the upper surface of said plate to support said object table.

4. The actuator of claim 2 having guides in coordinate directions to each other to abut vertical faces of an object table and having springs to bias said object table to said guides.

5. The actuator of claim 1 in which said guide element is adjustable in the direction of the tilting of said links.

6. The actuator of claim 5 having slidable wedges contacting said guides and movable to move said guides in the direction of tilting of said links.

7. The actuator of claim 4 in which said coordinate guides are adjustable one in the direction of tilting of said links and the other in the direction transverse to the direction of tilting of said links.

8. The actuator of claim 2 having a sub-plate bearing against the under surface of said supporting element plate and slidable relatively thereto and springs extending upwardly from said sub-plate for adjustment to the object table.

9. The actuator of claim 1 having a spring bias under said supporting element in one direction, and a rail having a cord connected to said supporting element and rotatable to move said supporting element against the bias of said spring.

References Cited in the file of this patent
UNITED STATES PATENTS

| | | |
|---|---|---|
| 2,034,110 | Mechau | Mar. 17, 1936 |
| 2,780,135 | Chandler | Feb. 5, 1957 |
| 2,909,099 | Hansen | Oct. 20, 1959 |

FOREIGN PATENTS

| | | |
|---|---|---|
| 489,768 | Germany | Jan. 22, 1930 |
| 519,333 | Italy | Mar. 12, 1955 |